United States Patent [19]

Beenken

[11] 4,264,663

[45] Apr. 28, 1981

[54] LAMINATED PACK COMPRISING A PLURALITY OF CLOSELY SUPERPOSED SHEETS AND METHOD AND DEVICE FOR FORMING THE PACK

[75] Inventor: Rolf Beenken, Springe, Fed. Rep. of Germany

[73] Assignee: Licentia Patent-Verwaltungs-G.m.b.H., Fed. Rep. of Germany

[21] Appl. No.: 27,724

[22] Filed: Apr. 6, 1979

[30] Foreign Application Priority Data

Apr. 10, 1978 [DE] Fed. Rep. of Germany ....... 2815359

[51] Int. Cl.[3] .......................... B32B 3/10; B32B 7/08

[52] U.S. Cl. .................................. 428/133; 428/137; 428/594; 428/597; 428/582; 428/223; 310/217; 29/609

[58] Field of Search ............... 428/132, 133, 134, 137, 428/582, 594, 597, 596, 583–585, 223; 310/217; 29/609, 521

[56] References Cited

U.S. PATENT DOCUMENTS

| | | | |
|---|---|---|---|
| 2,135,807 | 11/1938 | Fitzgerald | 428/597 X |
| 2,924,312 | 2/1960 | Williams | 29/521 |
| 2,975,312 | 3/1961 | Ploran | 310/217 |
| 4,110,895 | 9/1978 | Mitsui | 428/133 X |
| 4,160,182 | 7/1979 | Mitsui | 310/217 X |

FOREIGN PATENT DOCUMENTS 402143 of 1966 Switzerland ............................ 310/217

*Primary Examiner*—George F. Lesmes
*Assistant Examiner*—Alexander S. Thomas
*Attorney, Agent, or Firm*—McGlew and Tuttle

[57] ABSTRACT

A laminated pack comprises a plurality of uniform, closely adjacent superposed sheets and a mechanical interconnection for said sheets holding them together which comprises the pinching of a portion of the sheets themselves against one another. The interconnection is effected by slitting the sheets in areas to form teeth on each side of a hole formed through the sheet or along an edge of the sheet and by subsequently deflecting the teeth in a stacked set of sheets so that adjacent ones of the teeth move into recesses vacated by similarly deflected teeth of the next adjacent sheet and fit into the area with a pinching interengagement. The pack is formed by feeding prestamped sheets along a feed path and separating and stacking individual sheets therefrom in a direction perpendicular to the advance direction of the strip and also pinching the sheet so that teeth formations of superposed sheets bear into the next adjacent sheet to hold them together. The apparatus advantageously includes a stamping tool designed as a combined tool and stacking mechanism which is mounted in a recess of a die plate which comprises two feed rollers having axes which are parallel to each other into the direction of a strip containing the prestamped sheets. The mechanism includes a plurality of contacting projections and a punching mechanism mounted above the recess separating the prestamped sheets from the fed strip and a punch which acts on teeth formations of the sheets to cause their pinching interengagement.

3 Claims, 7 Drawing Figures

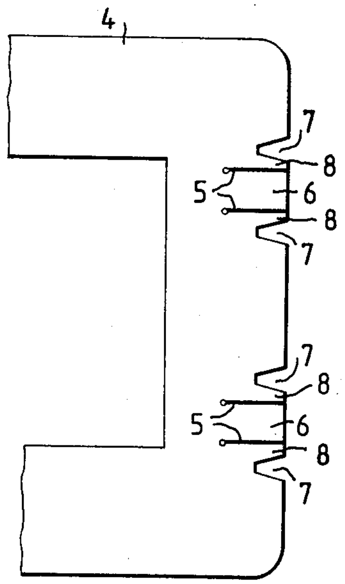
FIG. 6
FIG.7
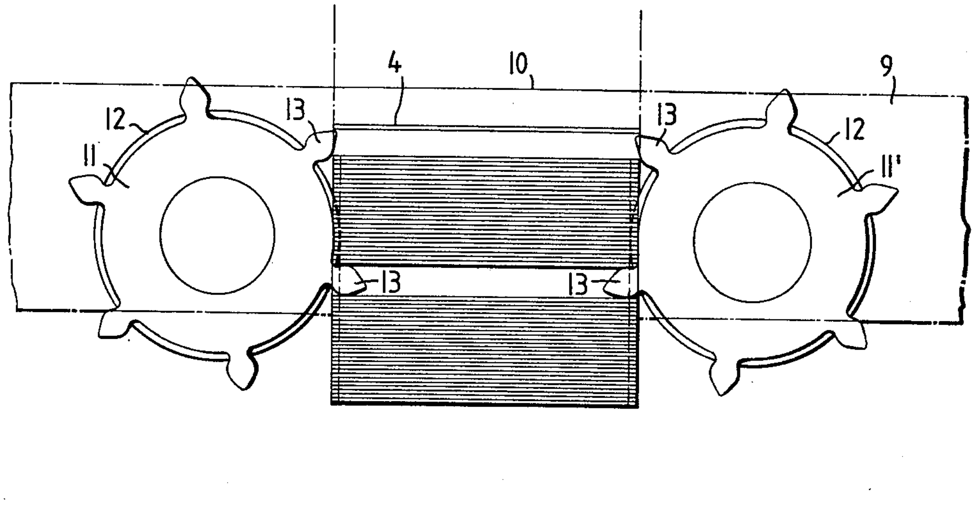

LAMINATED PACK COMPRISING A PLURALITY OF CLOSELY SUPERPOSED SHEETS AND METHOD AND DEVICE FOR FORMING THE PACK

FIELD AND BACKGROUND OF THE INVENTION

This invention relates in general to the construction of a laminated pack of sheets, for example, for use in electrical apparatus and, in particular, to a new and useful laminated pack which comprises a plurality of uniformly closely superposed sheets which are mechanically interconnected together and to a method and device for effecting the formation of such packs.

DESCRIPTION OF THE PRIOR ART

Laminated packs are used, for example, in dry systems of electrical meters. Such packs are expensive to manufacture because the individual sheets must first be separated from a strip and then fed into a stacking arrangement and then riveted together.

SUMMARY OF THE INVENTION

The present invention provides a laminated pack which can be manufactured as a finished part and, in accordance with the invention, a plurality of sheets are superposed and held together by a mechanical crimping or pinching action forming engaging teeth on each sheet which engages into a recess formed by a similar tooth on the next adjacent sheet to hold them together in a stack.

In accordance with the method of the invention, a laminated pack is formed by feeding a prestamped strip and separating individual sheets from the strip and moving them, for example, in a direction perpendicular to the advance movement and, at the same time, effecting the formation of teeth in sheets which interengage in recesses of the next adjacent strip when the teeth are deflected so that they become pinched against each other and hold the sheets in a stack.

The device for carrying out the method advantageously includes a die plate having a recess along which a strip containing the prestamped sheets are fed into a tool for separating the sheets from the strip and stacking them in a vertical stack and for subsequently operating on crimping locations of each sheet to force teeth-like elements of one sheet into engagement with a displaced area of similarly formed teeth of the next adjacent sheet so that the teeth move into pinching engagement with the next adjacent sheet and the sheets are held together in a stack.

Accordingly, an object of the present invention is to provide a laminated pack which comprises a plurality of uniform, closely superposed sheets and a mechanical interconnection for said sheets holding them together which comprises a pinching of a portion of the sheets themselves against one another.

A further object of the invention is to provide a method of manufacturing laminated packs in which prestamped sheets are separated from a delivered strip and stacked and, at the same time, pinched against one another to hold them together into a stack.

Another object of the invention is to provide a device for forming laminated packs which includes a stamping tool designed as a combined tool and stacking mechanism mounted in a recess of a die plate and comprising two feed rollers having their axes parallel to each other and parallel to a movement of a strip containing the sheets to be stacked, wherein, each sheet is provided with a holding tooth formation which is acted upon by a tool or punching mechanism above the recess to act on the teeth to cause their pinching interengagement with the subadjacent sheet and the binding together of all of the sheets of the lamination into a pack.

A further object of the invention is to provide a laminated pack which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the Drawings:

FIG. 6 is a partial top plan view of another embodiment of stamped sheet for a laminated pack; and FIG. 7 is a partial elevational view of another embodiment of device for manufacturing a laminated pack with sheets similar to those shown in FIG. 6.

DESCRIPTION OF THE PREFERRED EMBODIMENTS

Figure 2:
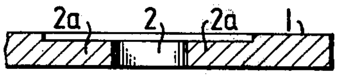
FIG. 2 is a partial sectional view through a pinching area of a sheet of the stack shown in FIG. 1.

Referring to the drawings in particular, the invention embodied therein, comprises a laminated pack, generally designated 50, which comprises a plurality of uniform, closely superposed sheets 1 and a mechanical interconnection, generally designated 52, for holding the sheets together, which comprises, a pinching of a portion of the sheets themselves against one another.

Figure 1:
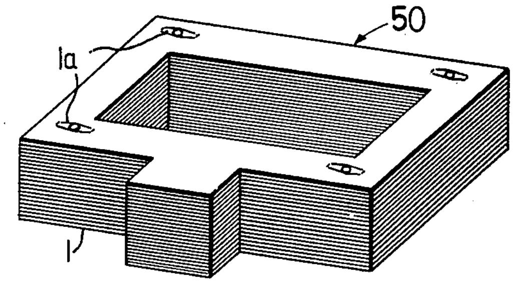
FIG. 1 is a front top perspective view of a laminated pack constructed in accordance with the invention.
Figure 3:
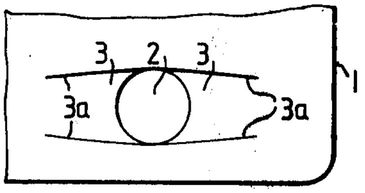
FIG. 3 is a partial top plan view of the sheet shown in FIG. 2.

The laminated pack, according to FIG. 1 comprises, a plurality of uniform, closely adjacent metal sheets 1, which are provided with deformations or clamping, pinching or crimping locations 1*a* in the areas of their corners. At the pinching locations 1*a*, circular holes 2 are punched into oblong compressed portions 2*a* (FIG. 2). Over the length of the compressed portions, teeth 3 are cut free which are widened in the direction of hole 2 (FIG. 3), and remain hinged to the associated sheet.

Figure 4:
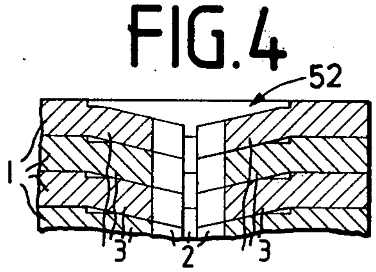
FIG. 4 is a partial sectional view through the laminated pack shown in FIG. 1 in the pinching area.

As shown in FIG. 4, the teeth 3 of the sheets are bent downwardly all in the same direction by substantially the thickness of the sheet, so that each end of a tooth 3 projects into the zone of the adjacent sheet. Since, due to the bending, the tooth ends engage into recesses 3*a* of the subjacent sheets at locations where the recess is narrower than the width of the tooth which engages into it, a strong pinching and securement is obtained.

Figure 5:
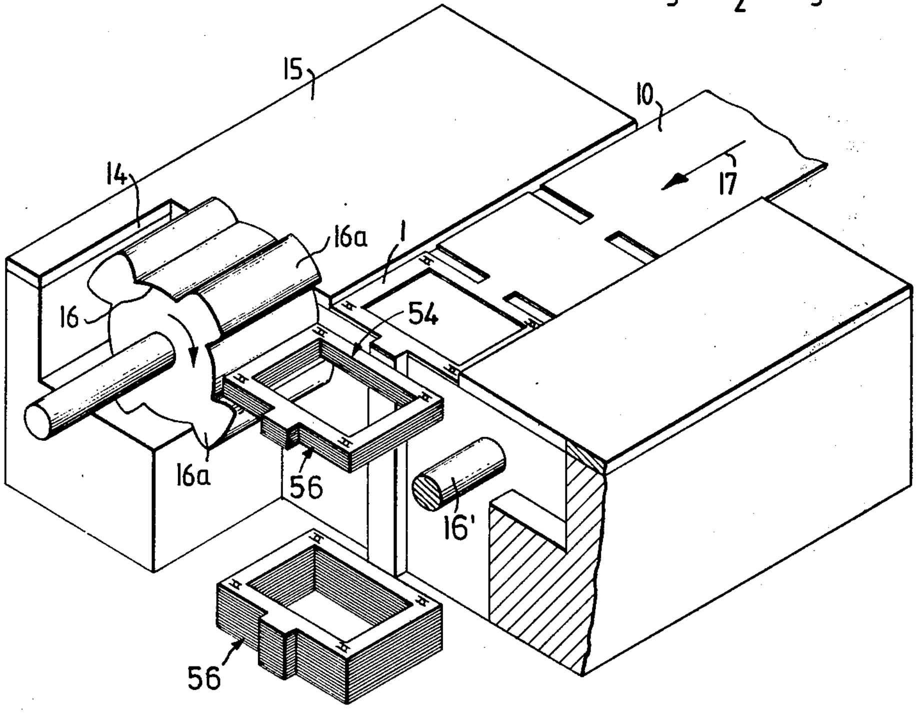
FIG. 5 is a front top perspective view, partly in section, showing a device for manufacturing a laminated pack according to FIG. 1.

In the device for producing the pinched connection, in accordance with FIGS. 1 through 4 and shown in FIG. 5, feed rollers 16, 16' are provided in a recess 14 of a die plate 15 of a stamping tool, and are mounted with their axes spaced apart and parallel to each other and to the advance direction of feeding indicated by arrow 17 of the delivered strip 10. For clarity, the front feed roller 16' is only partly shown.

Each of the two feed rollers are provided with contact projections 16a on their circumference, and their circumferential base surfaces are spaced from each other by a distance which is larger than the width of the delivered strip. The sheets which have been prestamped in several operations and provided with the compressed portions 2a in the zone of holes 2 are separated from the delivered strip by a punching tool (not shown) in the zone of the feed rollers and pressed against contact projections 16a, and against the sheets which have been previously separated and are now stacked below the feed rollers 16, 16'.

At each stroke of the stamping tool, the teeth 3 which are already cut free of the uppermost sheet are pressed by assembly punches of the stamping punch to engage into the subjacent sheets. A zipper-like interengagement, as shown in FIG. 4, is thereby produced ensuring an intimate connection of the sheets. Upon reaching the required height of the stack programmed in the tool, the feed rollers eject the finished pack from the tool by the back side of their contact projections 16a.

In the embodiment of FIG. 6, sheet 4 has teeth 6 between incisions 5, 5' and recesses 7 are provided flanking the teeth. The teeth 6 which are bent in a similar manner as in the embodiment of FIG. 4 are clamped to the adjacent sheet by thrusting the sheet portions 8 remaining between incisions 5 and recesses 7 over the teeth of the adjacent sheet.

The device shown in FIG. 7 for manufacturing a laminated pack which sheets have a configuration according to FIG. 6 is designed similarly as the device of FIG. 5, that is, here again, a pair of feed rollers 11, 11' with their axes parallel to each other and to the advance direction of the delivered strip 10 is provided in a recess of a die plate 9 of a combined tool. The sheet 4 separated from the delivered strip is brought, by a motion perpendicular to the advance direction, into the zone of the feed rollers 11, 11' by which it is further displaced, by a sheet thickness at a time; and is simultaneously under an increased pressure, pinched against the subjacent sheet by means of thrust rings 12 which engage into the recesses 7. The laminated pack finished in this manner leaves the tool as soon as contact projections 13 of the feed rollers 11 and 11' clear the way for the ejection of the pack.

With the method of the invention, a strip of material end is fed along a feed path as indicated by the arrow 17 and individual sheets 1 are separated from the strip 10 and they are delivered downwardly by feed rollers 16 in a vertical stacking which is perpendicular to the advance direction or feed direction 17. At the same time, means in the form of a punch, indicated by the arrow 54, acts to effectively separate each sheet from the strip 10 and deliver it into a stack 56 which is assembled to the desired number of sheets and, thereafter, the same or similar tool 54 acts on the teeth 3 to cause them to be displaced out of each sheet and fitted into the recesses formed by the teeth of the next subjacent sheet in a pinching interengagement to hold the sheets together in the assembled stack 56.

The device shown in FIG. 5 for carrying out the method of the invention, comprises, the feed rollers having the projections which support these stacks 56 as they are being formed and permit the punching means 54 to act on the stacks to cause the pinching interengagement thereof.

While specific embodiments of the invention have been shown and described in detail to illustrate the application of the principles of the invention, it will be understood that the invention may be embodied otherwise without departing from such principles.

What is claimed is:

1. A laminated pack comprising a plurality of uniform, closely superposed sheets and a mechanical interconnection established between said sheets holding them together, comprising, a pinched area in each sheet having hole extending through the sheet with a tooth formation bounding at least one side of said hole and hinged to the sheet and being deflected downwardly into the next adjacent sheet, each pinched area being aligned with each other pinched area of the superposed sheets, said tooth formations formed by cutting away the sheet on each side of said tooth formation, said teeth being formed so that they have a wider end adjacent said hole and having an opposite end hinged to the sheet, the material thickness of said teeth being thinner than the other areas of said sheets to form a recess at the top of each sheet over each tooth into which a tooth or a sheet thereover is displaced, said teeth when displaced in said recesses having their wider portion forced into a narrower displaced portion of the subjacent sheet which has a tooth portion which is displaced downwardly into the next subjacent sheet, and with some space not occupied by a tooth remaining in each recess.

2. A laminated pack, as claimed in claim 1, wherein each of said sheets has at least four pinched areas thereon.

3. A laminated pack, as claimed in claim 1, wherein each of said sheets has an edge with at least one tooth formation bounding the edge, said sheets having a cutaway portion on each side of the tooth forming a tab which is displaced laterally to engage over a tooth of a subjacent sheet which is displaced downwardly into the recess vacated by the tooth of the affected sheet.

* * * * *